United States Patent
You et al.

(10) Patent No.: US 11,665,601 B2
(45) Date of Patent: May 30, 2023

(54) METHOD FOR HANDOVER REPORT AND TERMINAL DEVICE

(71) Applicant: GUANGDONG OPPO MOBILE TELECOMMUNICATIONS CORP., LTD., Guangdong (CN)

(72) Inventors: Xin You, Guangdong (CN); Qianxi Lu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 106 days.

(21) Appl. No.: 17/196,277

(22) Filed: Mar. 9, 2021

(65) Prior Publication Data

US 2021/0195481 A1 Jun. 24, 2021

Related U.S. Application Data

(63) Continuation of application No. PCT/CN2018/111739, filed on Oct. 24, 2018.

(30) Foreign Application Priority Data

Sep. 27, 2018 (WO) ................ PCT/CN2018/108044

(51) Int. Cl.
*H04W 36/00* (2009.01)
*H04W 76/18* (2018.01)
(Continued)

(52) U.S. Cl.
CPC ....... *H04W 36/0079* (2018.08); *H04W 36/14* (2013.01); *H04W 56/001* (2013.01); *H04W 74/0833* (2013.01); *H04W 76/18* (2018.02)

(58) Field of Classification Search
CPC ............. H04W 36/0079; H04W 36/14; H04W 56/001; H04W 74/0833; H04W 76/18;
(Continued)

(56) References Cited

U.S. PATENT DOCUMENTS 10,721,654 B2 * 7/2020 Byun ................... H04W 36/023
10,772,021 B2 * 9/2020 Wang ................ H04W 36/0055
(Continued)

FOREIGN PATENT DOCUMENTS

CN 101026857 A 8/2007
CN 101048001 A 10/2007
(Continued)

OTHER PUBLICATIONS

Extended European Search Report for EP Application 18934783.4 dated Nov. 22, 2021. (10 pages).
(Continued)

*Primary Examiner* — Ahmed Elallam
(74) *Attorney, Agent, or Firm* — Young Basile Hanlon & MacFarlane, P.C.

(57) ABSTRACT

Method for handover report and a terminal device are provided. In the method for handover report, the terminal device sends first indication information when connection establishment between the terminal device and the first target network device is successful, the first indication information is for indicating to a source network device that connection establishment between the terminal device and the first target network device is successful; and/or the terminal device sends a second indication information when connection establishment between the terminal device and the first target network device fails, where the second indication information is for indicating to the source network device that connection establishment between the terminal device and the first target network device fails.

20 Claims, 5 Drawing Sheets

SEND FIRST INDICATION INFORMATION, WHEN CONNECTION ESTABLISHMENT BETWEEN THE TERMINAL DEVICE AND A FIRST TARGET NETWORK DEVICE IS SUCCESSFUL, THE FIRST INDICATION INFORMATION IS FOR INDICATING TO A SOURCE NETWORK DEVICE THAT CONNECTION ESTABLISHMENT BETWEEN THE TERMINAL DEVICE AND THE FIRST TARGET NETWORK DEVICE IS SUCCESSFUL; OR
SEND SECOND INDICATION INFORMATION, WHEN CONNECTION ESTABLISHMENT BETWEEN THE TERMINAL DEVICE AND THE FIRST TARGET NETWORK DEVICE FAILS, THE SECOND INDICATION INFORMATION IS FOR INDICATING TO THE SOURCE NETWORK DEVICE THAT CONNECTION ESTABLISHMENT BETWEEN THE TERMINAL DEVICE AND THE FIRST TARGET NETWORK DEVICE FAILS

201

(51) Int. Cl.
*H04W 74/08* (2009.01)
*H04W 36/14* (2009.01)
*H04W 56/00* (2009.01)

(58) Field of Classification Search
CPC ............. H04W 36/18; H04W 36/0033; H04W 36/0055; H04W 36/0011; H04W 36/0058; H04W 36/0061; H04W 36/0069; H04W 36/08

See application file for complete search history.

(56) References Cited

U.S. PATENT DOCUMENTS

| | | | |
|---|---|---|---|
| 11,096,016 B2* | 8/2021 | Chen | H04L 5/0091 |
| 11,399,321 B2* | 7/2022 | Yiu | H04W 74/008 |
| 11,516,726 B2* | 11/2022 | You | H04W 36/0055 |
| 2011/0117905 A1 | 5/2011 | Huang et al. | |
| 2013/0316713 A1 | 11/2013 | Xu et al. | |
| 2015/0245261 A1 | 8/2015 | Teyeb et al. | |
| 2015/0249950 A1* | 9/2015 | Teyeb | H04W 48/04 455/437 |
| 2016/0174124 A1 | 6/2016 | Basu Mallick et al. | |
| 2016/0338134 A1* | 11/2016 | Nagasaka | H04W 76/15 |
| 2017/0230935 A1* | 8/2017 | Xu | H04W 36/30 |
| 2018/0083688 A1* | 3/2018 | Agiwal | H04W 48/16 |
| 2019/0037635 A1* | 1/2019 | Guo | H04W 76/27 |
| 2019/0116541 A1* | 4/2019 | Hong | H04W 76/27 |
| 2019/0253945 A1* | 8/2019 | Paladugu | H04W 36/0069 |
| 2020/0008113 A1* | 1/2020 | Chen | H04W 48/16 |
| 2020/0275319 A1* | 8/2020 | Murray | H04B 7/0695 |
| 2021/0127447 A1* | 4/2021 | Zhang | H04W 80/02 |
| 2021/0160752 A1* | 5/2021 | You | H04W 76/30 |

FOREIGN PATENT DOCUMENTS

| | | | | |
|---|---|---|---|---|
| CN | 101345986 A | 1/2009 | | |
| CN | 102256318 A | 11/2011 | | |
| CN | 103327514 A | 9/2013 | | |
| CN | 104039023 A | 9/2014 | | |
| CN | 105264955 A | 1/2016 | | |
| CN | 106537984 A | 3/2017 | | |
| CN | 107708160 A | 2/2018 | | |
| EP | 2836017 A1 | 2/2015 | | |
| EP | 2955962 A1 | 12/2015 | | |
| EP | 3101992 A1 | 12/2016 | | |
| EP | 3358901 A1 | 8/2018 | | |
| KR | 20170114258 A | 10/2017 | | |
| WO | 2017163670 A1 | 9/2017 | | |
| WO | 2017171405 A1 | 10/2017 | | |
| WO | WO-2017194021 A1 * | 11/2017 | ........ | H04W 36/0016 |

OTHER PUBLICATIONS

3rd Generation Partnership Project; Technical Specification Group Radio Access Network; NR; NR and NG-RAN Overall Description; Stage 2, Release 15, 3GPP TS 38.300, V15.2.0, Jun. 2018. (87 pages).
3rd Generation Partnership Project; Technical Specification Group Radio Access Network; NR; Radio Resource Control (RRC) protocol specification, Release 15, 3GPP TS 38.331, V15.2.0, Jun. 2018. (304 pages).
Intel Corporation, New WID: NR mobility enhancements, 3GPP TSG RAN Meeting #80, RP-181433, May 21-25, 2018. (5 pages).
Chinese First Office Action with English Translation for CN Application 202110394330.3 dated Feb. 18, 2022. (28 pages).
Indian Examination Report for IN Application 202117018723 dated Feb. 9, 2022. (6 pages).
ISR with English Translation issued in corresponding international application No. PCT/CN2018/108044 dated Apr. 28, 2019.
ISR with English Translation issued in corresponding international application No. PCT/CN2018/111739 dated May 30, 2019.
Taiwan Office Action with English Translation for TW Application 108135351 dated Oct. 27, 2022. (40 pages).
Chinese Second Office Action with English Translation for CN Application 202110394330.3 dated Jul. 4, 2022. (14 pages).
Communication pursuant to Article 94(3) EPC for EP Application 18934783.4 dated Jun. 29, 2022. (7 pages).
Japanese Notice of Reasons for Refusal with English Translation for JP Application 2021517372 dated Jul. 22, 2022. (6 pages).

* cited by examiner

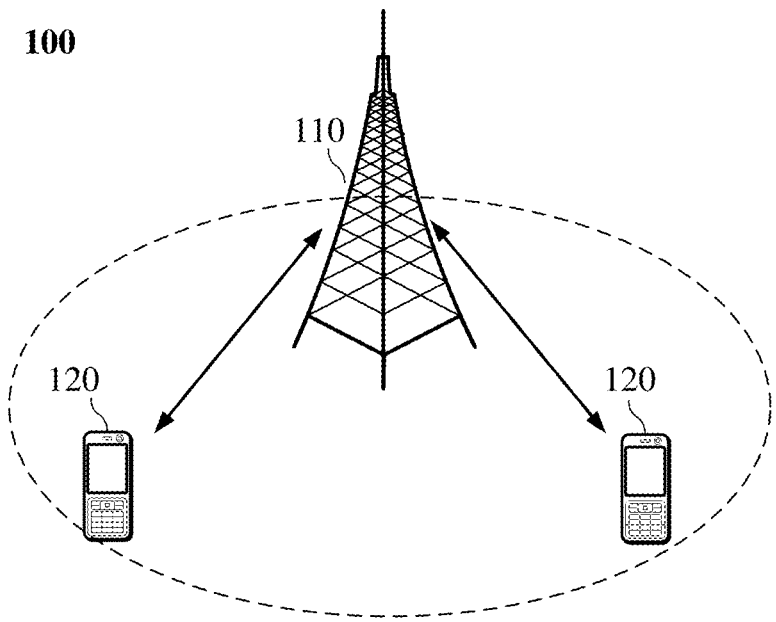

FIG. 1

SEND FIRST INDICATION INFORMATION, WHEN CONNECTION ESTABLISHMENT BETWEEN THE TERMINAL DEVICE AND A FIRST TARGET NETWORK DEVICE IS SUCCESSFUL, THE FIRST INDICATION INFORMATION IS FOR INDICATING TO A SOURCE NETWORK DEVICE THAT CONNECTION ESTABLISHMENT BETWEEN THE TERMINAL DEVICE AND THE FIRST TARGET NETWORK DEVICE IS SUCCESSFUL; OR
SEND SECOND INDICATION INFORMATION, WHEN CONNECTION ESTABLISHMENT BETWEEN THE TERMINAL DEVICE AND THE FIRST TARGET NETWORK DEVICE FAILS, THE SECOND INDICATION INFORMATION IS FOR INDICATING TO THE SOURCE NETWORK DEVICE THAT CONNECTION ESTABLISHMENT BETWEEN THE TERMINAL DEVICE AND THE FIRST TARGET NETWORK DEVICE FAILS

RECEIVE FIRST INDICATION INFORMATION AND/OR SECOND INDICATION INFORMATION. THE FIRST INDICATION INFORMATION IS FOR INDICATING TO THE SOURCE NETWORK DEVICE THAT CONNECTION ESTABLISHMENT BETWEEN A TERMINAL DEVICE AND A FIRST TARGET NETWORK DEVICE IS SUCCESSFUL, THE SECOND INDICATION INFORMATION IS FOR INDICATING TO THE SOURCE NETWORK DEVICE THAT CONNECTION ESTABLISHMENT BETWEEN THE TERMINAL DEVICE AND THE FIRST TARGET NETWORK DEVICE FAILS. / 401

FIG. 4

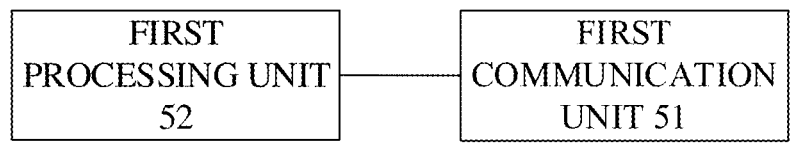

FIG. 5

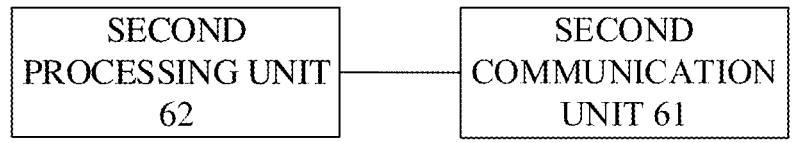

FIG. 6

METHOD FOR HANDOVER REPORT AND TERMINAL DEVICE

CROSS-REFERENCE TO RELATED APPLICATION(S)

This application is a continuation of International Application No. PCT/CN2018/111739, filed on Oct. 24, 2018, which claims priority to International Application No. PCT/CN2018/108044, filed on Sep. 27, 2018, the disclosures of both of which are hereby incorporated by reference in their entireties.

TECHNICAL FIELD

The present disclosure relates to the field of information processing technology, and particularly to a method for handover report, a terminal device, a network device, a chip, a computer readable storage medium, a computer program product, and a computer program.

BACKGROUND

In the process of mobile communication, handover may be accompanied by handover failure. In the existing handover, when a terminal device receives a handover command, it will stop data transmission with a source network device. When there is more than one handover, for example, the terminal device receives a reconfiguration message from at least one base station and maintains the connection with the source base station during the handover, how to control the terminal device to indicate the failure or success of connection with the target network device to the source network device remains a problem to be solved.

SUMMARY

According to a first aspect, a method for handover report is provided. The method is applicable to a terminal device and includes at least one of: sending first indication information, when connection establishment between the terminal device and a first target network device is successful, wherein the first indication information is for indicating to a source network device that connection establishment between the terminal device and the first target network device is successful; or sending second indication information, when connection establishment between the terminal device and the first target network device fails, wherein the second indication information is for indicating to the source network device that connection establishment between the terminal device and the first target network device fails.

According to a second aspect, a terminal device is provided. The terminal device includes at least one processor, a transceiver, and a memory storing instructions which, when executed by the at least one processor, cause the transceiver to: send first indication information when connection establishment between a terminal device and a first target network device is successful, wherein the first indication information is for indicating to a source network device that connection establishment between the terminal device and the first target network device is successful; and/or send second indication information when connection establishment between the terminal device and the first target network device fails, wherein the second indication information is for indicating to the source network device that connection establishment between the terminal device and the first target network device fails.

BRIEF DESCRIPTION OF DRAWINGS

FIG. 1 is a schematic diagram illustrating a communication system architecture according to embodiments.

FIG. 2 is a schematic flow chart illustrating a method for handover report according to embodiments.

FIG. 4 is another schematic flow chart illustrating a method for handover report according to embodiments.

FIG. 5 is a schematic structural diagram illustrating a terminal device according to embodiments.

FIG. 6 is a schematic structural diagram illustrating a network device according to embodiments.

DETAILED DESCRIPTION

Figure 3:
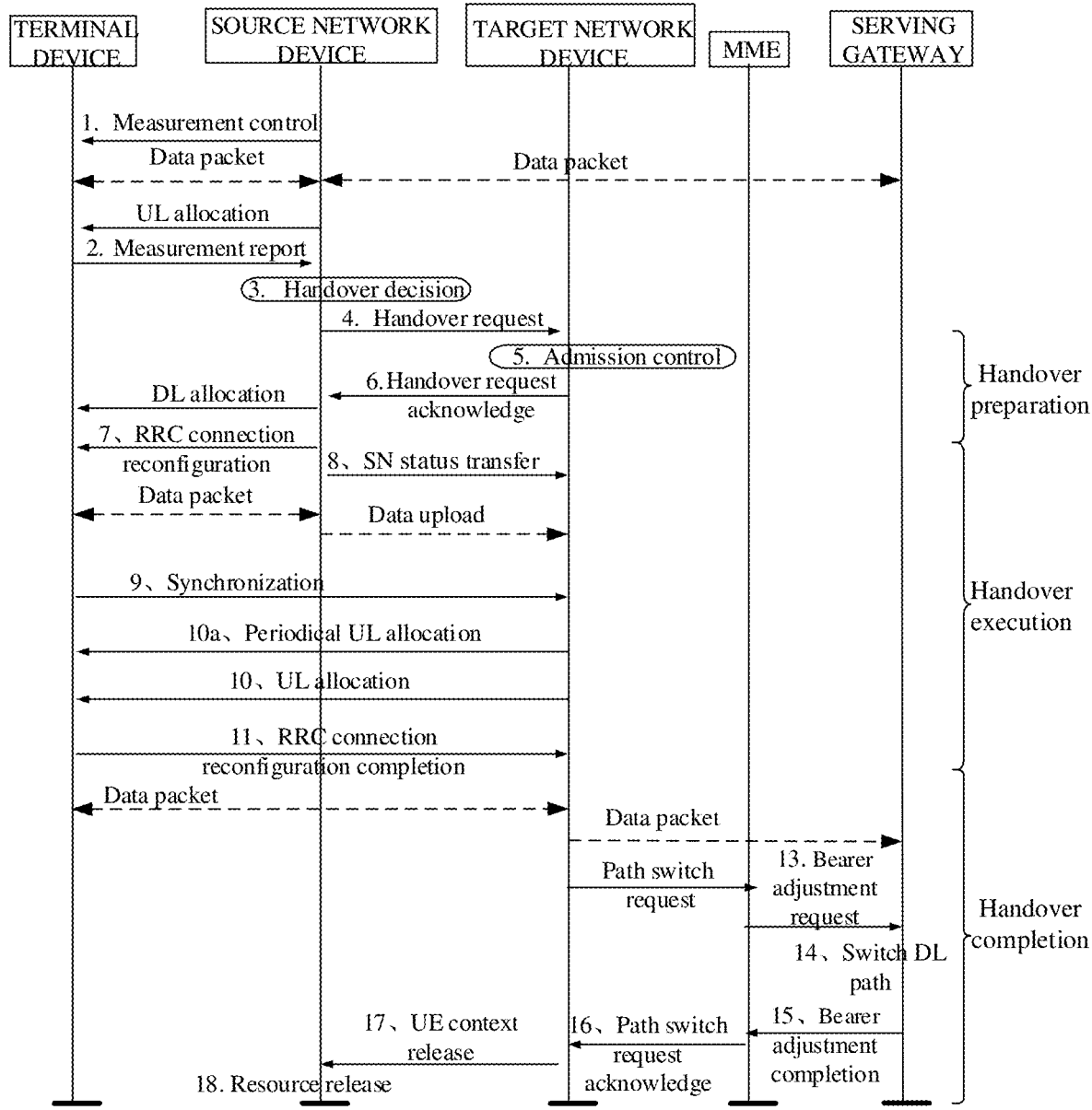
FIG. 3 is a schematic diagram illustrating a handover scenario according to embodiments.

Technical solutions in the embodiments of the disclosure will be described in combination with the drawings in the following. Obviously, the described embodiments are merely part rather than all of the embodiments of the application. Based on the embodiments provided herein, all other embodiments obtained by ordinary technical personnel in the art without making creative labor shall fall within the scope of protection of the disclosure.

The technical solutions of embodiments are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, or a 5th generation mobile network (5G) system.

Exemplary, a communication system 100 to which technical solutions are applied is illustrated in FIG. 1. The communication system 100 includes a network device 110. The network device 110 can be a device in communication with a terminal device 120 which is also known as a terminal or communication terminal. The network device 110 can provide a communication coverage for a specific geographical area and communicate with terminal devices in the coverage area. The network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 located in the coverage area of the network device 110. The "terminal device" referred to herein can include but is not limited to a device configured to communicate via a wired line, another data connection/network, a wireless interface, a device which is part of another terminal device and configured to receive/send communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone receiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

As an example, terminal devices 120 can communicate with each other through device to device (D2D) communication.

As an example, the 5G system or 5G network can also be referred to as an NR system or NR network.

FIG. 1 exemplarily illustrates one network device and two terminal devices. The communication system 100 may also include multiple network devices, and there can be other numbers of terminal devices in a coverage area of each of the network devices, which is not limited herein.

The communication system 100 may further include other network entities such as a network controller, a mobile management entity, or the like, and the disclosure is not limited in this regard.

According to implementations, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the disclosure is not limited in this regard.

In the following, the terms "network device" and "base station" can be used interchangeably. For instance, "source network device" can also be referred to as "source base station" and "target network device" can also be referred to as "target base station".

The terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

For better understanding of the characteristics and technical contents of the embodiments, the implementation of the embodiments is described in detail with the accompanying drawings. The accompanying drawings are for reference only and are not used to limit the embodiments.

Embodiment 1

A method for handover report is provided. The method is applicable to a terminal device and begins at block 201, as illustrated in FIG. 2.

At block 201, when connection establishment between the terminal device and a first target network device is successful, the terminal device sends a first indication information, where the first indication information is for indicating to a source network device that connection establishment between the terminal device and the first target network device is successful; and/or, when connection establishment between the terminal device and the first target network device fails, the terminal device sends a second indication information, where the second indication information is for indicating to the source network device that connection establishment between the terminal device and the first target network device fails.

The transmission of the first indication information and/or the second indication information is not restricted in order, and can be adjusted according to actual needs.

Connection establishment between the terminal device and the first target network device is successful when: random access of the terminal device to the first target network device is successful, or synchronization between the terminal device and the first target network device is achieved.

In other words, when the terminal device initiates random access to the first target network device, the terminal device will send the first indication information if the random access is successful. Alternatively, the terminal device sends an uplink message to the first target network device, once synchronization between the terminal device and the first target network device is achieved, then it is determined that connection establishment between the terminal device and the first target network device is successful.

The method is applicable to a scenario where at least one target network device is configured for the terminal device. In this situation, before operations at block 201, the method further includes: receiving from the source network device a handover command. The handover command contains configuration information with respect to at least one target network device, and the at least one target network device includes the first target network device.

The handover command can be sent to the terminal device through the source network device, and the source network device can acquire information of the target network device from at least one target network device.

The handover as well as information acquisition are illustrated in FIG. 3. As illustrated in FIG. 3, the handover includes a handover preparation stage, a handover execution stage, and a handover completion stage.

The handover preparation stage includes steps 1-6 in FIG. 3: the source network device sends measurement control to the terminal device; the terminal device measures multiple network devices or cells and sends a measurement report to the source network device; the source network device makes a handover decision according to the measurement report (or further in combination with radio resource management (RRM) information) received; the source network device sends a handover request to the target network device such that the target network device prepares to handover; the target network device makes handover admission control according to the handover request; the target network device sends a handover request acknowledge to the source network device when the target network device decides to handover.

The handover then proceeds to the handover execution stage, which includes steps 7-11 of FIG. 3: the target network device generates RRC information and sends RRC reconfiguration information to the source network device, and then the source network device forwards the RRC reconfiguration information to the terminal device; after receiving the RRC reconfiguration information, the terminal device makes handover according to the RRC reconfiguration information; the source network device sends SN status transition to the target network device; the terminal device is synchronized with the target network device, receives uplink (UL) allocation from the target network device, and sends RRC connection reconfiguration completion information to the target network device.

At last, the handover proceeds to the handover completion stage, which includes steps 12-18 of FIG. 3: the target network device sends a path switch request to a mobility management entity (MME) to inform the MME that the terminal device changes a cell; the MME sends a bearer adjustment request to a service gateway and makes DL path switch; the service gateway sends a bearer adjustment completion message to the MME after bearer adjustment is completed and then the MME sends an acknowledge message responsive to the path switch request to the target network device; the target network device requests the source network device to release terminal device context, and then the source network device releases resources.

When the terminal device receives the handover command from at least one target network device, the terminal device can select the first target network device from the at least one target network device according to the handover command and then initiates connection with the first target network device.

The first indication information contains: identifier (ID) of the first target network device with which the connection establishment is successful; or ID of the first target network device with which the connection establishment is successful and ID of at least one other target network device with which the connection establishment fails, where the first target network device is different from the at least one other target network device.

In other words, if the terminal device is connected with the first target network device successfully, the terminal device sends the ID of the first target network device to the source network device.

In the handover procedure, before establishing connection with the first target network device, the terminal device may have attempted to establish connection with other target network devices, such as a fourth network device or a fifth network device. If the terminal device fails to establish connection with the other target network devices, the terminal device will record the ID of the other target network devices. Till the terminal device is connected with the first target network device successfully, the terminal device will send the ID of the first target network device together with the ID of the other target network devices to the source network device.

Another possible situation is that, the terminal device can send the second indication information to the network side every time the connection establishment fails. In this case, when the terminal device is connected with the first target network device successfully, the terminal device may carry in the first indication information only the ID of the first target network device with which the connection establishment is successful, to send the first indication information to the source network device. Alternatively, the terminal device may carry in the first indication information the ID of the first target network device and the ID of other target network devices with which the connection establishment fails, to send the first indication information to the source network device.

The second indication information further contains: the reason for connection establishment failure with the first target network device; and/or ID of the first target network device.

The reason for connection establishment failure may include: T304 timer expiration; T307 timer expiration; random access reaches a maximum number of retransmissions; and other reasons for handover.

The T304 timer and T307 timer are preset timers. The T304 timer may be triggered by reception of the RRC connection reconfiguration information at the terminal device, where the RRC connection reconfiguration information contains mobility control information. The T307 timer may be triggered by reception of the RRC connection reconfiguration information at the terminal device, where the RRC connection reconfiguration information contains secondary cell group (SCG) mobility control information. The T304 timer will be stopped in response to handover success. The T307 timer will be stopped in response to random access success of the terminal device to PSCell. It is considered that the handover fails when the T304 timer or the T307 timer expires, and corresponding actions such as RRC reconnection or other information notification will be carried out, which will not be detailed herein.

The maximum number of retransmissions for random access can be set according to actual needs, such as 10, or more than or less than 10, which is not particularly limited.

In the case that the second indication information sent, that is, connection establishment with the first target network device fails, a new target network device can be selected from at least one target network device configured for the terminal device, for example, a second target network device can be selected from the at least one target network device and then the terminal device attempts to connect with the second target network device. The second target network device can be assigned as a new first target network device and the operations described above will be repeated. A threshold can be set for the number of times of target network device reselection ("reselection threshold" for short), for example, according to actual needs. The threshold can be 5 or other suitable numbers. When the number of times of target network device reselection reaches the reselection threshold, it can be determined that the handover fails, and operations such as RRC connection reestablishment, returning to an Idle state or other states, and the like can be carried out, which will not be detailed herein.

The technical scheme provided herein is also applicable to a scenario where one target network device is configured for the terminal device and the terminal device remains connected with the source network device. The technical scheme here differs from the technical scheme in the above scenario in that, the second indication information further contains: information instructing the source network device to select a second target network device for the terminal device to make handover.

That is to say, the source network device can select from multiple target network devices a second target network device for the terminal device, such that the terminal device can initiate access to the second target network device. The second target network device can be assigned as a new first target network device and the operations described above will be repeated. The second target network device is different from the first target network device. Furthermore, the source network device can control the number of times of reselection, specifically, the source network device can control the number of times of reselection according to a preset reselection threshold, for example, the threshold can be 8, which is not restricted herein.

The first indication information or the second indication information further contains: connection state of the terminal device.

The connection state of the terminal device includes one of: connection state with the source network device, connection state with the first target network device, connection state with the second target network device. The first target network device and the second target network device are target network devices for the terminal device to make handover; alternatively, the first target network device and the second target network device are secondary nodes (SN) and the source network device is a main node (MN). SN is named as SCG in the long term evolution (LTE) system and SN in the new radio (NR) system, SCG and SN however refer to the same concept, that is, a second service network device in DC scenario.

To be detailed, the connection state of the terminal device can be one of: the terminal device remains connected with the source network device and fails to be connected with the target network device; the terminal device is disconnected from the source network device and is connected with the target network device successfully; the terminal device fails to be connected with SCG and SCG connection change fails. In a scenario where multiple SCGs are configured, the terminal device fails to be connected with one SCG; in a scenario where multiple target cells are configured, the terminal device fails to be connected with one target cell. There may be other scenarios in which the technical scheme can be implemented, which will not be elaborated herein.

The following will describe the manner in which the first indication information and the second indication information are sent.

The first indication information is sent to the source network device through RRC signaling, or the first indication information is sent to the network side through non-access stratum (NAS) signaling.

The second indication information is sent to the source network device through RRC signaling, or the second indication information is sent to the network side through NAS signaling.

The first indication information and/or the second indication information can be sent to the source network device or can be sent to the network side, specifically, to an evolved universal terrestrial radio access (E-UTRA) network. It can be understood that, after being sent to the network side, the first indication information and/or the second indication information can be saved at the source network device through inter or intra connections of the network(s).

The first indication information is sent in the following manners. The first indication information is sent to the source network device directly; or, the first indication information is forwarded to the source network device through the first target network device; or, the first indication information is sent to the network side.

The second indication information is sent in the following manners. The second indication information is sent to the source network device directly; or, the second indication information is sent to the network side.

That is to say, when the terminal device is connected with the first target network device, the terminal device can send the first indication information to the source network device directly to inform connection success, or, the first indication information can be sent to the source network device by the first target network device. Alternatively, the first indication information can be sent to the first target network device by the terminal device and then forwarded to the source network device by the first target network device; or, the first indication information can be sent to the network side such as E-UTRA. After the first indication information is sent to the target network device by the terminal device, the first target network device can send the first indication information to the source network device and/or to the network side.

When the terminal device fails to be connected with the first target network device, the terminal device can send the second indication information to the source network device directly to inform connection failure with the first target network device or the terminal device can send the second indication information to the network side. Alternatively, if the terminal device fails to be connected with the first target network device, the second indication information can also be sent to the source network device by the first target network device. Since no connection is established between the terminal device and the first target network device, it is unable for the terminal device to send the second indication information to the first target network device.

The first indication information and/or the second indication information may further contain measurement information obtained during handover. After receiving the first indication information and/or the second indication information, the network side or the source base station can use the measurement information for subsequent network optimization. The measurement information in the second indication information obtained during failed handover can be used by the network side for subsequent network optimization.

Figure 10:
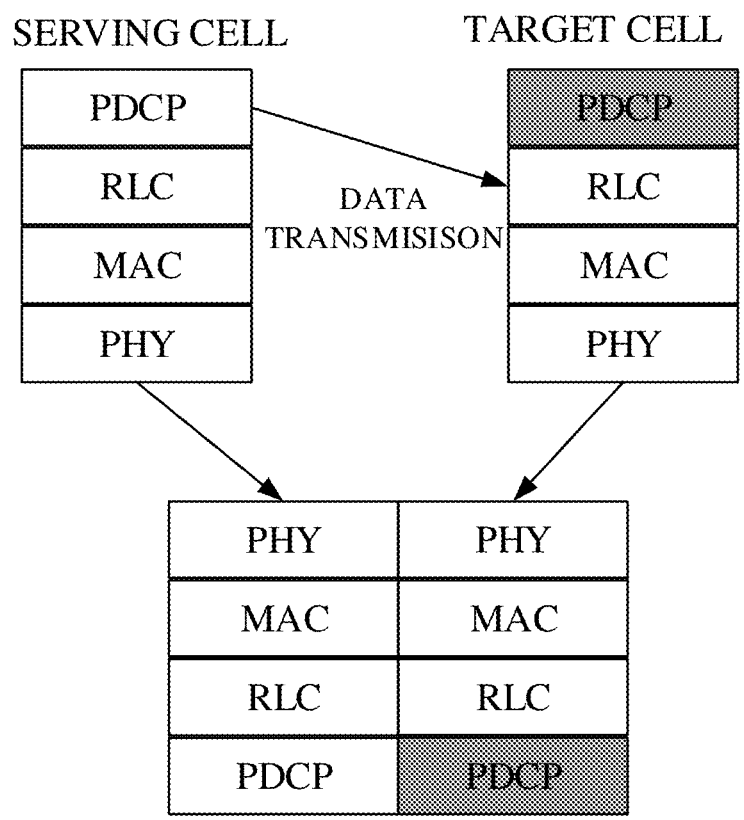
FIG. 10 is a schematic diagram illustrating a protocol stack in a dual connection (DC) architecture according to embodiments.

The technical solution provided herein is also applicable to a handover procedure in a dual-connection (DC) architecture. When the terminal device switches to a target base station from a source base station, the source base station can add the first target network device as an SN of the source network device. FIG. 10 is a schematic diagram illustrating a protocol stack in MCG bearer and MCG split bearer in DC architecture. As illustrated in FIG. 10, the serving cell can be deemed as the protocol stack of the MN of the terminal device, and the target cell can be deemed as the protocol stack of the first target network device, that is, protocol stack of the SN.

The terminal device can be currently in connection with the MN. When the terminal device makes handover, the terminal device takes the SN of the source network device is as the MN, where the SN of the source network device is the first target network device, and establishes a connection with the first target network device.

The terminal device may make handover upon reception of a handover command, and switches the SN of the source network device, that is, the first target network device, into the MN to achieve zero delay handover. When the SN of the source network device is taken as the MN, the source network device can be taken as the SN of the first target network device.

That is to say, if the terminal device makes handover to the first target network device successfully, the first target network device will serve as the MN, and the source network device will serve as the SN of the first target network device.

In this situation, if the SN fails to be switched to the MN, that is, if connection establishment with the first target network device fails, RRC connection reestablishment will be triggered. The RRC connection reestablishment can be triggered by connection establishment failure with the first target network device caused by for example bearer failure of the MCG, such as RLC automatic retransmission request (ARQ) of data carried by the MCG bearer reaches a preset threshold of retransmission.

Alternatively, if the SN fails to be switched to the MN, that is, if connection establishment with the first target network device fails, second indication information can be sent. The second indication information can be sent to the source network device directly or can be sent to the network side. In the DC architecture, the source network device can be understood as the MN before handover.

Sending of the second indication information can be triggered by: secondary cell group (SCG) failure, ARQ of data carried by main cell group (MCG) split bearer exceeds a preset threshold of retransmission, or ARQ of data carried by SCG split bearer exceeds a preset threshold of retransmission.

When initiating connection with the first target network device, the terminal device can also retain the connection with the source network device. For example, the terminal device maintains a first protocol stack and a first key associated with the source network device, and maintains a second protocol stack and a second key associated with the first target network device.

The first key is different from the second relevant key. The second key can be generated from the first relevant key.

The first protocol stack may be the same as or different from the second protocol stack, or at least partially different from the second protocol stack. For example, for the 5G system, service data adaptation protocols (SDAP), packet data convergence protocols (PDCP), radio link control (RLC) layer control protocols, media access control (MAC) entities, and low layer entities maintained between the terminal device and the source network device are different from that maintained between the terminal device and the first target network device. For the 4G system, PDCP entities, RLC) entities, MAC entities, and low layer entities maintained between the terminal device and the source network device are different from that maintained between the terminal device and the first target network device. In embodiments, in order to ensure the use of different keys, the PDCPs of the first protocol stack and the second protocol stack must be different. At least one of SDAP, RLC, MAC, and physical layers may be the same or different. Alternatively, the first protocol stack and the second protocol stack may share at least one of SDAP, RLC, MAC, and physical layers. Alternatively, the first protocol stack and the second protocol stack may each have SDAP, RLC, MAC, and physical layers respectively.

According to the technical schemes described above, when establishing a connection with the first target network device, first indication information and/or second indication information is sent to the source network device, to inform the source network device whether connection with the first target network device is successful or not. The technical schemes for transmitting indication information to the source network device may be implemented in different handover scenarios.

Embodiment 2

A method for handover report is provided, the method is applicable to a source network device. As illustrated in FIG. 4, the method begins at block 401.

At block 401, first indication information and/or second indication information is received. The first indication information is for indicating to the source network device that connection establishment between a terminal device and a first target network device is successful, the second indication information is for indicating to the source network device that connection establishment between the terminal device and the first target network device fails.

Connection establishment between a terminal device and a first target network device is successful when: random access of the terminal device to the first target network device is successful, or synchronization between the terminal device and the first target network device is achieved.

In other words, when the terminal device initiates random access to the first target network device, the terminal device sends the first indication information if the random access is successful. Alternatively, the terminal device sends an uplink message to the first target network device, once synchronization between the terminal device and the first target network device is achieved, then it is determined that connection establishment between the terminal device and the first target network device is successful.

The method further includes the following prior to reception of the first indication information and/or the second indication information: a handover command is sent to the terminal device. The handover command contains configuration information with respect to at least one target network device, and the at least one target network device includes the first target network device.

The source network device can acquire information of the target network device from at least one target network device. The handover as well as information acquisition are illustrated in FIG. 3. As illustrated in FIG. 3, the handover includes a handover preparation stage, a handover execution stage, and a handover completion stage.

The handover as well as information acquisition are illustrated in FIG. 3. As illustrated in FIG. 3, the handover includes a handover preparation stage, a handover execution stage, and a handover completion stage.

The handover preparation stage includes steps 1-6 in FIG. 3: the source network device sends measurement control to the terminal device; the terminal device measures multiple network devices or cells and sends a measurement report to the source network device; the source network device makes a handover decision according to the measurement report (or together with radio resource management (RRM) information) received; the source network device sends a handover request to the target network device such that the target network device prepares to handover; the target network device makes handover admission control according to the handover request; the target network device sends a handover request acknowledge to the source network device when the target network device decides to handover.

The handover then proceeds to the handover execution stage, which includes steps 7-11 of FIG. 3: the target network device generates RRC information and sends RRC reconfiguration information to the source network device, and then the source network device forwards the RRC reconfiguration information to the terminal device; after receiving the RRC reconfiguration information, the terminal device makes handover according to the RRC reconfiguration information; the source network device sends SN status transition to the target network device; the terminal device is synchronized with the target network device, receives uplink (UL) allocation from the target network device, and sends RRC connection reconfiguration completion information to the target network device.

At last, the handover proceeds to the handover completion stage, which includes steps 12-18 of FIG. 3: the target network device sends a path switch request to a mobility management entity (MME) to inform the MME that the terminal device changes a cell; the MME sends a bearer adjustment request to a service gateway and makes DL path switch; the service gateway sends a bearer adjustment completion message to the MME after bearer adjustment is completed and then the MME sends an acknowledge message responsive to the path switch request to the target network device; the target network device requests the source network device to release terminal device context, and then the source network device releases resources.

When the terminal device receives the handover command from at least one target network device, the terminal device can select the first target network device from the at least one target network device according to the handover command and then initiates connection with the first target network device.

The first indication information contains: identifier (ID) of the first target network device with which the connection establishment is successful; or ID of the first target network device with which the connection establishment is successful and ID of at least one other target network device with which the connection establishment fails, where the first target network device is different from the at least one other target network device.

In other words, if the terminal device is connected with the first target network device successfully, the terminal device sends the ID of the first target network device to the source network device.

In the handover procedure, before establishing connection with the first target network device, the terminal device may have attempted to establish connection with other target network devices, such as a fourth network device or a fifth network device. If the terminal device fails to establish connection with the other target network devices, the terminal device will record the ID of the other target network devices. Till the terminal device is connected with the first target network device successfully, the terminal device will send the ID of the first target network device together with IDs of the other target network devices to the source network device.

Another possible situation is that, the terminal device can send the second indication information to the network side every time the connection establishment fails. In this case, when the terminal device is connected with the first target network device successfully, the terminal device may carry in the first indication information only the ID of the first target network device with which the connection establishment is successful, to send the first indication information to the source network device. Alternatively, the terminal device may carry in the first indication information the ID of the first target network device and the ID of other target network devices with which the connection establishment fails, to send the first indication information to the source network device.

The second indication information further contains: the reason for connection establishment failure with the first target network device; and/or ID of the first target network device.

The reason for connection establishment failure may include: T304 timer expiration; T307 timer expiration; random access reaches a maximum number of retransmissions; and other reasons for handover.

The T304 timer and T307 timer are preset timers. The T304 timer may be triggered by reception of the RRC connection reconfiguration information at the terminal device, where the RRC connection reconfiguration information contains mobility control information. The T307 timer may be triggered by reception of the RRC connection reconfiguration information at the terminal device, where the RRC connection reconfiguration information contains secondary cell group (SCG) mobility control information. The T304 timer will be stopped in response to handover success. The T307 timer will be stopped in response to random access success of the terminal device to PSCell. It is considered that the handover fails when the T304 timer or the T307 timer expires, and corresponding actions such as RRC reconnection or other information notification will be carried out, which will not be detailed herein.

The maximum number of retransmissions for random access can be set according to actual needs, such as 10, or more than or less than 10, which is not particularly limited.

In case that the second indication information is received, that is, connection establishment with the first target network device fails, a new target network device can be selected from at least one target network device configured for the terminal device, for example, a second target network device can be selected from the at least one target network device and then the terminal device attempts to connect with the second target network device. The second target network device can be assigned as a new first target network device and the operations described above will be repeated. A threshold can be set for the number of times of target network device reselection ("reselection threshold" for short), for example, according to actual needs. The threshold can be 5 or other suitable numbers. When the number of times of target network device reselection reaches the reselection threshold, it can be determined that the handover fails, and operations such as RRC connection reestablishment, returning to an Idle state or other states, and the like can be carried out, which will not be detailed herein.

The technical scheme provided herein is also applicable to a scenario where one target network device is configured for the terminal device and the terminal device remains connected with the source network device. The technical scheme differs from that in the above scenario in that, the second indication information further contains: information instructing the source network device to select a second target network device for the terminal device to make handover. Correspondingly, the method further includes: after the second indication information is received, a second target network device is selected from at least one target network device for the terminal device according to the second indication information, and the selection result is sent to the terminal device.

That is to say, the source network device can select from multiple target network devices a second target network device for the terminal device, such that the terminal device can initiate access to the second target network device. The second target network device can be assigned as a new first target network device and the operations described above will be repeated. The second target network device is different from the first target network device. Furthermore, the source network device can control the number of times of reselection, specifically, the source network device can control the number of times of reselection according to a preset reselection threshold, for example, the threshold can be 8, which is not restricted herein.

The first indication information or the second indication information further contains: connection state of the terminal device.

The connection state of the terminal device includes one of: connection state with the source network device, connection state with the first target network device, connection state with the second target network device. The first target network device and the second target network device are target network devices for the terminal device to make handover; alternatively, the first target network device and the second target network device are secondary nodes (SN) and the source network device is a main node (MN). SN is named as SCG in the long term evolution (LTE) system and SN in the new radio (NR) system, SCG and SN however refer to the same concept, that is, a second service network device in DC scenario.

To be detailed, the connection state of the terminal device can be one of: the terminal device remains connected with the source network device and fails to be connected with the target network device; the terminal device is disconnected from the source network device and is connected with the target network device successfully; the terminal device fails to be connected with SCG and SCG connection change fails. In a scenario where multiple SCGs are configured, the terminal device fails to be connected with one SCG; in a scenario where multiple target cells are configured, the terminal device fails to be connected with one target cell. There may be other scenarios in which the technical scheme can be implemented, which will not be elaborated herein.

The following will describe the manner in which the first indication information and the second indication information are received.

The first indication information is received through RRC signaling, or the first indication information is received through non-access stratum (NAS) signaling from the network side.

Alternatively or additionally, the second indication information is received through RRC signaling, or the second indication information is received through NAS signaling from the network side.

The first indication information can be received at the source network device in the following manners. The first indication information is received by the source network device from the terminal device directly. The first indication information is forwarded by the first target network device. Or, the first indication information is obtained from the network side.

The second indication information is received at the source network device in the following manners. The second indication information is received at the source network device from the terminal device directly. The second indication information is sent by the first target network device. Or, the second indication information is obtained from the network side.

That is to say, when the terminal device is connected with the first target network device, the terminal device can send the first indication information to the source network device directly to inform connection success, or, the first indication information can be sent to the source network device by the first target network device. Alternatively, the first indication information can be sent to the first target network device by the terminal device and then forwarded to the source network device by the first target network device; or, the first indication information can be sent to the network side such as E-UTRA.

When the terminal device fails to be connected with the first target network device, the terminal device can send the second indication information to the source network device directly to inform connection failure with the first target network device or the terminal device can send the second indication information to the network side. Alternatively, if the terminal device fails to be connected with the first target network device, the second indication information can also be sent to the source network device by the first target network device. Since no connection is established between the terminal device and the first target network device, it is unable for the terminal device to send the second indication information to the first target network device.

After the first indication information and/or the second indication information is received, the source network device sends the first indication information and/or the second indication information received to the network side for example through NAS signaling.

The first indication information and/or the second indication information may further contain measurement information obtained during handover. After receiving the first indication information and/or the second indication information, the network side or the source base station can use the measurement information for subsequent network optimization. The measurement information in the second indication information obtained during failed handover can be used by the network side for subsequent network optimization.

The technical solution provided herein is also applicable to a handover procedure in a dual-connection (DC) architecture. When the terminal device switches to a target base station from a source base station, the source base station can add the first target network device as an SN of the source network device. FIG. 10 is a schematic diagram illustrating a protocol stack in MCG bearer and MCG split bearer in DC architecture. The serving cell can be deemed as the protocol stack of the MN of the terminal device, and the target cell can be deemed as the protocol stack of the first target network device, that is, protocol stack of the SN. When switch to the SN from MN, data of PDCP can be transmitted to the RLC of the target cell directly.

In the DC architecture, after successful handover, the source network device, that is, the source network device served as the SN of the first target network device, can be deleted. In case of handover failure, the second indication information can be received from the terminal device or the first target network device.

When the terminal device initiates connection with the first target network device, the terminal device can also maintain the connection with the source network device. The terminal device maintains a first protocol stack and a first key associated with the source network device, and maintains a second protocol stack and a second key associated with the first target network device.

The first key is different from the second key. The second key can be generated from the first key.

The first protocol stack may be the same as or different from the second protocol stack, or at least partially different from the second protocol stack. For example, for the 5G system, service data adaptation protocols (SDAP), packet data convergence protocol (PDCP) entities, radio link control (RLC) layer control protocol entities, media access control (MAC) entities, and low layer entities maintained between the terminal device and the source network device are different from that maintained between the terminal device and the first target network device. For the 4G system, PDCP entities, RLC) entities, MAC entities, and low layer entities maintained between the terminal device and the source network device are different from that maintained between the terminal device and the first target network device. In embodiments, in order to ensure the use of different keys, the PDCPs of the first protocol stack and the second protocol stack must be different. At least one of SDAP, RLC, MAC, and physical layers may be the same or different. The first protocol stack and the second protocol stack may share at least one of SDAP, RLC, MAC, and physical layers. Alternatively, the first protocol stack and the second protocol stack may each have SDAP, RLC, MAC, and physical layers respectively. Alternatively, the first protocol stack and the second protocol stack may share at least one of SDAP, RLC, MAC, and physical layers. Alternatively, the first protocol stack and the second protocol stack may each have SDAP, RLC, MAC, and physical layers respectively.

According to the technical schemes described above, when establishing a connection with the first target network device, first indication information and/or second indication information is sent to the source network device, to inform the source network device whether connection with the first target network device is successful or not. The technical schemes for transmitting indication information to the source network device may be implemented in different handover scenarios.

Embodiment 3

A method for handover report is provided. The method is applicable to a target network device and includes the following operations.

First indication information and/or second indication information is sent to a network side. Alternatively, the first indication information and/or the second indication information is sent to a source base station. The first indication information is for indicating to a source network device that connection establishment between a terminal device and the target network device is successful. The second indication information is for indicating to the source network device that connection establishment between the terminal device and the target network device fails.

The first indication information contains identifier (ID) of the target network device with which the connection establishment is successful, or ID of the target network device with which the connection establishment is successful and ID of at least one other target network device with which the connection establishment fails, where the target network device is different from the at least one other target network device.

That is to say, if connection establishment with the target network device is successful, the target network device sends the ID of the target network device to the source network device.

The second indication information contains: the reason for connection establishment failure with the target network device; and/or ID of the target network device.

The reason for connection establishment failure may include: T304 timer expiration; T307 timer expiration; random access reaches a maximum number of retransmissions; and other reasons for handover.

The T304 timer and T307 timer are preset timers. The T304 timer may be triggered by reception of the RRC connection reconfiguration information at the terminal device, where the RRC connection reconfiguration information contains mobility control information. The T307 timer may be triggered by reception of the RRC connection reconfiguration information at the terminal device, where the RRC connection reconfiguration information contains secondary cell group (SCG) mobility control information. The T304 timer will be stopped in response to handover success. The T307 timer will be stopped in response to random access success of the terminal device to PSCell. It is considered that the handover fails when the T304 timer or the T307 timer expires, and corresponding actions such as RRC reconnection or other information notification will be carried out, which will not be detailed herein.

The first indication information or the second indication information further contains: connection state of the terminal device.

The connection state of the terminal device includes one of: connection state with the source network device, connection state with the first target network device, connection state with the second target network device. The first target network device and the second target network device are target network devices for the terminal device to make handover; alternatively, the first target network device and the second target network device are secondary nodes (SN) and the source network device is a main node (MN). SN is named as SCG in the long term evolution (LTE) system and SN in the new radio (NR) system, SCG and SN however refer to the same concept, that is, a second service network device in DC scenario.

To be detailed, the connection state of the terminal device can be one of: the terminal device remains connected with the source network device and fails to be connected with the target network device; the terminal device is disconnected from the source network device and is connected with the target network device successfully; the terminal device fails to be connected with SCG and SCG connection change fails. In a scenario where multiple SCGs are configured, the terminal device fails to be connected with one SCG; in a scenario where multiple target cells are configured, the terminal device fails to be connected with one target cell. There may be other scenarios in which the technical scheme can be implemented, which will not be elaborated herein.

The following will describe the manner in which the first indication information and the second indication information are sent.

The first indication information and/or the second indication information is sent to the network side through NAS signaling.

Alternatively, the first indication information and/or the second indication information is sent to the source base station through RRC signaling.

In one implementation, the first indication information and/or the second indication information is received from the terminal device directly. Alternatively, the first indication information and/or the second indication information is obtained through the network side.

That is to say, when connection establishment between the terminal device and the target network device is successful, the terminal device can send the first indication information to the first target network device directly and then first target network device forwards the first indication information to the source network device. Alternatively, the terminal device can send the first indication information to the network side such as E-UTRA.

On the other hand, when connection establishment between the terminal device and the target network device fails, the target network device can determine whether it is connected with the terminal device successfully and send the second indication information to the network side or to the source base station.

The first indication information and/or the second indication information may further contain measurement information obtained during handover. After receiving the first indication information and/or the second indication information, the network side or the source base station can use the measurement information for subsequent network optimization. The measurement information in the second indication information obtained during failed handover can be used by the network side for subsequent network optimization.

The technical solution provided herein is also applicable to a handover procedure in a dual-connection (DC) architecture. When the terminal device switches to a target base station from a source base station, the source base station can add the first target network device as an SN of the source network device. FIG. 10 is a schematic diagram illustrating a protocol stack in MCG bearer and MCG split bearer in DC architecture. The serving cell can be deemed as the protocol stack of the MN of the terminal device, and the target cell can be deemed as the protocol stack of the first target network device, that is, protocol stack of the SN.

In this DC architecture, when the handover is successful, the source network device, which serves as the SN of the first target network device, can be deleted; on the other hand, when the handover fails, the first target network device can send the second indication information to the source network device and/or the network side.

According to the technical schemes described above, when establishing a connection with the first target network device, first indication information and/or second indication information is sent to the source network device, to inform the source network device whether connection with the first target network device is successful or not. The technical schemes for transmitting indication information to the source network device may be implemented in different handover scenarios.

Embodiment 4

A terminal device is provided. As illustrated in FIG. 5, the terminal device includes a first communication unit 51 and a first processing unit 52.

The first communication unit is configured to send first indication information when connection establishment between the terminal device and a first target network device is successful, where the first indication information is for indicating to a source network device that connection establishment between the terminal device and the first target network device is successful. Additionally, or alternatively, the first communication unit is configured to send second indication information when connection establishment between the terminal device and the first target network device fails, where the second indication information is for indicating to the source network device that connection establishment between the terminal device and the first target network device fails.

The first processing unit 52 is configured to determine that the connection establishment between the terminal device and the first target network device is successful when: random access from the terminal device to the first target network device is successful; or synchronization between the terminal device and the first target network device is achieved.

In other words, when the terminal device initiates random access to the first target network device, the terminal device will send the first indication information if the random access is successful. Alternatively, the terminal device sends an uplink message to the first target network device, once synchronization between the terminal device and the first target network device is achieved, then it is determined that connection establishment between the terminal device and the first target network device is successful.

The technical solution is applicable to a scenario where at least one target network device is configured for the terminal device. In this situation, the first communication unit 51 is configured to receive from the source network device a handover command. The handover command contains configuration information with respect to at least one target network device, and the at least one target network device includes the first target network device.

The handover command can be sent to the terminal device through the source network device, and the source network device can acquire information of the target network device from at least one target network device. The handover as well as information acquisition are illustrated in FIG. 3. As illustrated in FIG. 3, the handover includes a handover preparation stage, a handover execution stage, and a handover completion stage.

The handover preparation stage includes steps 1-6 in FIG. 3: the source network device sends measurement control to the terminal device; the terminal device measures multiple network devices or cells and sends a measurement report to the source network device; the source network device makes a handover decision according to the measurement report (or further in combination with radio resource management (RRM) information) received; the source network device sends a handover request to the target network device such that the target network device prepares to handover; the target network device makes handover admission control according to the handover request; the target network device sends a handover request acknowledge to the source network device when the target network device decides to handover.

The handover then proceeds to the handover execution stage, which includes steps 7-11 of FIG. 3: the target network device generates RRC information and sends RRC reconfiguration information to the source network device, and then the source network device forwards the RRC reconfiguration information to the terminal device; after receiving the RRC reconfiguration information, the terminal device makes handover according to the RRC reconfiguration information; the source network device sends SN status transition to the target network device; the terminal device is synchronized with the target network device, receives uplink (UL) allocation from the target network device, and sends RRC connection reconfiguration completion information to the target network device.

At last, the handover proceeds to the handover completion stage, which includes steps 12-18 of FIG. 3: the target network device sends a path switch request to a mobility management entity (MME) to inform the MME that the terminal device changes a cell; the MME sends a bearer adjustment request to a service gateway and makes DL path switch; the service gateway sends a bearer adjustment completion message to the MME after bearer adjustment is completed and then the MME sends an acknowledge message responsive to the path switch request to the target network device; the target network device requests the source network device to release terminal device context, and then the source network device releases resources.

When the terminal device receives the handover command from at least one target network device, the terminal device can select the first target network device from the at least one target network device according to the handover command and then initiates connection with the first target network device.

The first indication information contains: identifier (ID) of the first target network device with which the connection establishment is successful; or ID of the first target network device with which the connection establishment is successful and ID of at least one other target network device with which the connection establishment fails, where the first target network device is different from the at least one other target network device.

In other words, if the terminal device is connected with the first target network device successfully, the terminal device sends the ID of the first target network device to the source network device.

In the handover procedure, before establishing connection with the first target network device, the terminal device may have attempted to establish connection with other target network devices, such as a fourth network device or a fifth network device. If the terminal device fails to establish connection with the other target network devices, the terminal device will record the ID of the other target network devices. Till the terminal device is connected with the first target network device successfully, the terminal device will send the ID of the first target network device together with the ID of the other target network devices to the source network device.

Another possible situation is that, the terminal device can send the second indication information to the network side every time the connection establishment fails. In this case, when the terminal device is connected with the first target network device successfully, the terminal device may carry in the first indication information only the ID of the first target network device with which the connection establishment is successful, to send the first indication information to the source network device. Alternatively, the terminal device may carry in the first indication information the ID of the first target network device and the ID of other target network devices with which the connection establishment fails, to send the first indication information to the source network device.

The second indication information further contains: the reason for connection establishment failure with the first target network device; and/or ID of the first target network device.

The reason for connection establishment failure may include: T304 timer expiration; T307 timer expiration; random access reaches a maximum number of retransmissions; and other reasons for handover.

The T304 timer and T307 timer are preset timers. The T304 timer may be triggered by reception of the RRC connection reconfiguration information at the terminal device, where the RRC connection reconfiguration information contains mobility control information. The T307 timer may be triggered by reception of the RRC connection reconfiguration information at the terminal device, where the RRC connection reconfiguration information contains secondary cell group (SCG) mobility control information. The T304 timer will be stopped in response to handover success. The T307 timer will be stopped in response to random access success of the terminal device to PSCell. It is considered that the handover fails when the T304 timer or the T307 timer expires, and corresponding actions such as RRC reconnection or other information notification will be carried out, which will not be detailed herein.

The maximum number of retransmissions for random access can be set according to actual needs, such as 10, or more than or less than 10, which is not particularly limited.

In the case that the second indication information sent, that is, connection establishment with the first target network device fails, a new target network device can be selected from at least one target network device configured for the terminal device, for example, a second target network device can be selected from the at least one target network device and then the terminal device attempts to connect with the second target network device. The second target network device can be assigned as a new first target network device and the operations described above will be repeated. A threshold can be set for the number of times of target network device reselection ("reselection threshold" for short), for example, according to actual needs. The threshold can be 5 or other suitable numbers. When the number of times of target network device reselection reaches the reselection threshold, it can be determined that the handover fails, and operations such as RRC connection reestablishment, returning to an Idle state or other states, and the like can be carried out, which will not be detailed herein.

The technical scheme provided herein is also applicable to a scenario where one target network device is configured for the terminal device and the terminal device remains connected with the source network device. The technical scheme here differs from the technical scheme in the above scenario in that, the second indication information further contains: information instructing the source network device to select a second target network device for the terminal device to make handover.

That is to say, the source network device can select from multiple target network devices a second target network device for the terminal device, such that the terminal device can initiate access to the second target network device. The second target network device can be assigned as a new first target network device and the operations described above will be repeated. The second target network device is different from the first target network device. Furthermore, the source network device can control the number of times of reselection, specifically, the source network device can control the number of times of reselection according to a preset reselection threshold, for example, the threshold can be 8, which is not restricted herein.

The first indication information or the second indication information further contains: connection state of the terminal device.

The connection state of the terminal device includes one of: connection state with the source network device, connection state with the first target network device, connection state with the second target network device. The first target network device and the second target network device are target network devices for the terminal device to make handover; alternatively, the first target network device and the second target network device are secondary nodes (SN) and the source network device is a main node (MN). SN is named as SCG in the long term evolution (LTE) system and SN in the new radio (NR) system, SCG and SN however refer to the same concept, that is, a second service network device in DC scenario.

To be detailed, the connection state of the terminal device can be one of: the terminal device remains connected with the source network device and fails to be connected with the target network device; the terminal device is disconnected from the source network device and is connected with the target network device successfully; the terminal device fails to be connected with SCG and SCG connection change fails. In a scenario where multiple SCGs are configured, the terminal device fails to be connected with one SCG; in a scenario where multiple target cells are configured, the terminal device fails to be connected with one target cell. There may be other scenarios in which the technical scheme can be implemented, which will not be elaborated herein.

The following will describe the manner in which the first indication information and the second indication information are sent.

The first communication unit 51 is configured to send the first indication information to the source network device through RRC signaling or send the first indication information to the network side through NAS signaling.

The first communication unit 51 is configured to send the second indication information to the source network device through RRC signaling, or send the second indication information to the network side through NAS signaling.

The first indication information and/or the second indication information can be sent to the source network device or can be sent to the network side, specifically, to an evolved universal terrestrial radio access (E-UTRA) network. It can be understood that, after being sent to the network side, the first indication information and/or the second indication information can be saved at the source network device through inter or intra connections of the network(s).

The first communication unit 51 is configured to: send the first indication information to the source network device directly; or, forward the first indication information to the source network device through the first target network device; or send the first indication information to the network side.

The first communication unit 51 is configured to: send the second indication information to the source network device; or, send the second indication information to the network side.

That is to say, when the terminal device is connected with the first target network device, the terminal device can send the first indication information to the source network device directly to inform connection success, or, the first indication information can be sent to the source network device by the first target network device. Alternatively, the first indication information can be sent to the first target network device by the terminal device and then forwarded to the source network device by the first target network device; or, the first indication information can be sent to the network side such as E-UTRA. After the first indication information is sent to the target network device by the terminal device, the first target network device can send the first indication information to the source network device and/or to the network side.

When the terminal device fails to be connected with the first target network device, the terminal device can send the second indication information to the source network device directly to inform connection failure with the first target network device or the terminal device can send the second indication information to the network side. Alternatively, if the terminal device fails to be connected with the first target network device, the second indication information can also be sent to the source network device by the first target network device. Since no connection is established between the terminal device and the first target network device, it is unable for the terminal device to send the second indication information to the first target network device.

The technical solution provided herein is also applicable to a handover procedure in a dual-connection (DC) architecture. When the terminal device switches to a target base station from a source base station, the first processing unit 52 is configured to add the first target network device as an SN of the source network device. FIG. 10 is a schematic diagram illustrating a protocol stack in MCG bearer and MCG split bearer in DC architecture. As illustrated in FIG. 10, the serving cell can be deemed as the protocol stack of the MN of the terminal device, and the target cell can be deemed as the protocol stack of the first target network device, that is, protocol stack of the SN.

The terminal device can be currently in connection with the MN. When the terminal device makes handover, the first processing unit 52 is configured to take the SN of the source network device is as the MN, where the SN of the source network device is the first target network device. The first processing unit 52 is further configured to establish a connection with the first target network device.

The terminal device may make handover upon reception of a handover command, and switches the SN of the source network device, that is, the first target network device, into the MN to achieve zero delay handover. When the SN of the source network device is taken as the MN, the first processing unit 52 is configured to take the source network device as the SN of the first target network device.

That is to say, if the terminal device makes handover to the first target network device successfully, the first target network device will serve as the MN, and the source network device will serve as the SN of the first target network device.

In this situation, if the SN fails to be switched to the MN, that is, if connection establishment with the first target network device fails, RRC connection reestablishment will be triggered. The RRC connection reestablishment can be triggered by connection establishment failure with the first target network device caused by for example bearer failure of the MCG, such as RLC automatic retransmission request (ARQ) of data carried by the MCG bearer reaches a preset threshold of retransmission.

Alternatively, if the SN fails to be switched to the MN, that is, if connection establishment with the first target network device fails, second indication information can be sent. The second indication information can be sent to the source network device directly or can be sent to the network side. In the DC architecture, the source network device can be understood as the MN before handover.

The first communication unit 51 is configured to send the second indication information when: secondary cell group (SCG) failure occurs, ARQ of data carried by main cell group (MCG) split bearer exceeds a preset threshold of retransmission, or ARQ of data carried by SCG split bearer exceeds a preset threshold of retransmission.

When initiating connection with the first target network device, the terminal device can also retain the connection with the source network device. For example, the terminal device maintains a first protocol stack and a first key associated with the source network device, and maintains a second protocol stack and a second key associated with the first target network device.

The first key is different from the second relevant key. The second key can be generated from the first relevant key.

The first protocol stack may be the same as or different from the second protocol stack, or at least partially different from the second protocol stack. For example, for the 5G system, service data adaptation protocols (SDAP), packet data convergence protocols (PDCP), radio link control (RLC) layer control protocols, media access control (MAC) entities, and low layer entities maintained between the terminal device and the source network device are different from that maintained between the terminal device and the first target network device. For the 4G system, PDCP entities, RLC) entities, MAC entities, and low layer entities maintained between the terminal device and the source network device are different from that maintained between the terminal device and the first target network device. In embodiments, in order to ensure the use of different keys, the PDCPs of the first protocol stack and the second protocol stack must be different. At least one of SDAP, RLC, MAC, and physical layers may be the same or different. Alternatively, the first protocol stack and the second protocol stack may share at least one of SDAP, RLC, MAC, and physical layers. Alternatively, the first protocol stack and the second protocol stack may each have SDAP, RLC, MAC, and physical layers respectively.

According to the technical schemes described above, when establishing a connection with the first target network device, first indication information and/or second indication information is sent to the source network device, to inform the source network device whether connection with the first target network device is successful or not. The technical schemes for transmitting indication information to the source network device may be implemented in different handover scenarios.

Embodiment 5

A source network device is provided. As illustrated in FIG. 6, the source network device includes a second communication unit 61 and a second processing unit 62.

The second communication unit 61 is configured to receive first indication information and/or second indication information. The first indication information is for indicating to the source network device, connection establishment between a terminal device and a first target network device is successful, the second indication information is for indicating to the source network device that connection establishment between the terminal device and the first target network device fails.

Connection establishment between the terminal device and the first target network device is successful when: random access of the terminal device to the first target network device is successful, or synchronization between the terminal device and the first target network device is achieved.

In other words, when the terminal device initiates random access to the first target network device, the terminal device sends the first indication information if the random access is successful. Alternatively, the terminal device sends an uplink message to the first target network device, once synchronization between the terminal device and the first target network device is achieved, then it is determined that connection establishment between the terminal device and the first target network device is successful.

The first communication unit 61 is configured to send a handover command to the terminal device before receiving the first indication information and/or the second indication information. The handover command contains configuration information with respect to at least one target network device, and the at least one target network device includes the first target network device.

The source network device can acquire information of the target network device from at least one target network device. The handover as well as information acquisition are illustrated in FIG. 3. As illustrated in FIG. 3, the handover includes a handover preparation stage, a handover execution stage, and a handover completion stage.

The handover as well as information acquisition are illustrated in FIG. 3. As illustrated in FIG. 3, the handover includes a handover preparation stage, a handover execution stage, and a handover completion stage.

The handover preparation stage includes steps 1-6 in FIG. 3: the source network device sends measurement control to the terminal device; the terminal device measures multiple network devices or cells and sends a measurement report to the source network device; the source network device makes a handover decision according to the measurement report (or together with radio resource management (RRM) information) received; the source network device sends a handover request to the target network device such that the target network device prepares to handover; the target network device makes handover admission control according to the handover request; the target network device sends a handover request acknowledge to the source network device when the target network device decides to handover.

The handover then proceeds to the handover execution stage, which includes steps 7-11 of FIG. 3: the target network device generates RRC information and sends RRC reconfiguration information to the source network device, and then the source network device forwards the RRC reconfiguration information to the terminal device; after receiving the RRC reconfiguration information, the terminal device makes handover according to the RRC reconfiguration information; the source network device sends SN status transition to the target network device; the terminal device is synchronized with the target network device, receives uplink (UL) allocation from the target network device, and sends RRC connection reconfiguration completion information to the target network device.

At last, the handover proceeds to the handover completion stage, which includes steps 12-18 of FIG. 3: the target network device sends a path switch request to a mobility management entity (MME) to inform the MME that the terminal device changes a cell; the MME sends a bearer adjustment request to a service gateway and makes DL path switch; the service gateway sends a bearer adjustment completion message to the MME after bearer adjustment is completed and then the MME sends an acknowledge message responsive to the path switch request to the target network device; the target network device requests the source network device to release terminal device context, and then the source network device releases resources.

When the terminal device receives the handover command from at least one target network device, the terminal device can select the first target network device from the at least one target network device according to the handover command and then initiates connection with the first target network device.

The first indication information contains: identifier (ID) of the first target network device with which the connection establishment is successful; or ID of the first target network device with which the connection establishment is successful and ID of at least one other target network device with which the connection establishment fails, where the first target network device is different from the at least one other target network device.

In other words, if the terminal device is connected with the first target network device successfully, the terminal device sends the ID of the first target network device to the source network device.

In the handover procedure, before establishing connection with the first target network device, the terminal device may have attempted to establish connection with other target network devices, such as a fourth network device or a fifth network device. If the terminal device fails to be connected with the other target network devices, the terminal device will record the ID of the other target network devices. Till the terminal device is connected with the first target network device successfully, the terminal device will send the ID of the first target network device together with IDs of the other target network devices to the source network device.

Another possible situation is that, the terminal device can send the second indication information to the network side every time the connection establishment fails. In this case, when the terminal device is connected with the first target network device successfully, the terminal device may carry in the first indication information only the ID of the first target network device with which the connection establishment is successful, to send the first indication information to the source network device. Alternatively, the terminal device may carry in the first indication information the ID of the first target network device and the ID of other target network devices with which the connection establishment fails, to send the first indication information to the source network device.

The second indication information further contains: the reason for connection establishment failure with the first target network device; and/or ID of the first target network device.

The reason for connection establishment failure may include: T304 timer expiration; T307 timer expiration; random access reaches a maximum number of retransmissions; and other reasons for handover.

The T304 timer and T307 timer are preset timers. The T304 timer may be triggered by reception of the RRC connection reconfiguration information at the terminal device, where the RRC connection reconfiguration information contains mobility control information. The T307 timer may be triggered by reception of the RRC connection reconfiguration information at the terminal device, where the RRC connection reconfiguration information contains secondary cell group (SCG) mobility control information. The T304 timer will be stopped in response to handover success. The T307 timer will be stopped in response to random access success of the terminal device to PSCell. It is considered that the handover fails when the T304 timer or the T307 timer expires, and corresponding actions such as RRC reconnection or other information notification will be carried out, which will not be detailed herein.

The maximum number of retransmissions for random access can be set according to actual needs, such as 10, or more than or less than 10, which is not particularly limited.

In case that the second indication information is received, that is, connection establishment with the first target network device fails, a new target network device can be selected from at least one target network device configured for the terminal device, for example, a second target network device can be selected from the at least one target network device and then the terminal device attempts to connect with the second target network device. The second target network device can be assigned as a new first target network device and the operations described above will be repeated. A threshold can be set for the number of times of target network device reselection ("reselection threshold" for short), for example, according to actual needs. The threshold can be 5 or other suitable numbers. When the number of times of target network device reselection reaches the reselection threshold, it can be determined that the handover fails, and operations such as RRC connection reestablishment, returning to an Idle state or other states, and the like can be carried out, which will not be detailed herein.

The technical scheme provided herein is also applicable to a scenario where one target network device is configured for the terminal device and the terminal device remains connected with the source network device. The technical scheme differs from that in the above scenario in that, the second indication information further contains: information instructing the source network device to select a second target network device for the terminal device to make handover.

The second processing unit 62 is configured to select a second target network device from at least one target network device for the terminal device according to the second indication information is received, and the selection result is sent to the terminal device through the second communication 61.

That is to say, the source network device can select from multiple target network devices a second target network device for the terminal device, such that the terminal device can initiate access to the second target network device. The second target network device can be assigned as a new first target network device and the operations described above will be repeated. The second target network device is different from the first target network device. Furthermore, the source network device can control the number of times of reselection, specifically, the source network device can control the number of times of reselection according to a preset reselection threshold, for example, the threshold can be 8, which is not restricted herein.

The first indication information or the second indication information further contains: connection state of the terminal device.

The connection state of the terminal device includes one of: connection state with the source network device, connection state with the first target network device, connection state with the second target network device. The first target network device and the second target network device are target network devices for the terminal device to make handover; alternatively, the first target network device and the second target network device are secondary nodes (SN) and the source network device is a main node (MN). SN is named as SCG in the long term evolution (LTE) system and SN in the new radio (NR) system, SCG and SN however refer to the same concept, that is, a second service network device in DC scenario.

To be detailed, the connection state of the terminal device can be one of: the terminal device remains connected with the source network device and fails to be connected with the target network device; the terminal device is disconnected from the source network device and is connected with the target network device successfully; the terminal device fails to be connected with SCG and SCG connection change fails. In a scenario where multiple SCGs are configured, the terminal device fails to be connected with one SCG; in a scenario where multiple target cells are configured, the terminal device fails to be connected with one target cell. There may be other scenarios in which the technical scheme can be implemented, which will not be elaborated herein.

The first indication information is received through RRC signaling, or the first indication information is received from the network side NAS signaling.

The second indication information is received through RRC signaling, or the second indication information is received from the network side through NAS signaling.

The first indication information is received in the following manners. The first indication information is received from the terminal device directly; the first indication information is forwarded by the first target network device; or the first indication information is received from the network side.

The second indication information is received in the following manners. The second indication information is received form the terminal device directly; the second indication information is forwarded by the first target network device; or the second indication information is received from the network side.

That is to say, when the terminal device is connected with the first target network device, the terminal device can send the first indication information to the source network device directly to inform connection success, or, the first indication information can be sent to the source network device by the first target network device. Alternatively, the first indication information can be sent to the first target network device by the terminal device and then forwarded to the source network device by the first target network device; or, the first indication information can be sent to the network side such as E-UTRA.

When the terminal device fails to be connected with the first target network device, the terminal device can send the second indication information to the source network device directly to inform connection failure with the first target network device or the terminal device can send the second indication information to the network side. Alternatively, if the terminal device fails to be connected with the first target network device, the second indication information can also be sent to the source network device by the first target network device. Since no connection is established between the terminal device and the first target network device, it is unable for the terminal device to send the second indication information to the first target network device.

After the first indication information and/or the second indication information is received, the source network device sends the first indication information and/or the second indication information received to the network side for example through NAS signaling.

The technical solution provided herein is also applicable to a handover procedure in a dual-connection (DC) architecture. When the terminal device switches to a target base station from a source base station, the source base station can add the first target network device as an SN of the source network device. FIG. 10 is a schematic diagram illustrating a protocol stack in MCG bearer and MCG split bearer in DC architecture. The serving cell can be deemed as the protocol stack of the MN of the terminal device, and the target cell can be deemed as the protocol stack of the first target network device, that is, protocol stack of the SN. When switch to the SN from MN, data of PDCP can be transmitted to the RLC of the target cell directly.

In the DC architecture, after successful handover, the source network device, that is, the source network device served as the SN of the first target network device, can be deleted. In case of handover failure, the second indication information can be received from the terminal device or the first target network device.

When the terminal device initiates connection with the first target network device, the terminal device can also maintain the connection with the source network device. The terminal device maintains a first protocol stack and a first key associated with the source network device, and maintains a second protocol stack and a second key associated with the first target network device.

The first key is different from the second key. The second key can be generated from the first key.

The first protocol stack may be the same as or different from the second protocol stack, or at least partially different from the second protocol stack. For example, for the 5G system, service data adaptation protocols (SDAP), packet data convergence protocol (PDCP) entities, radio link control (RLC) layer control protocol entities, media access control (MAC) entities, and low layer entities maintained between the terminal device and the source network device are different from that maintained between the terminal device and the first target network device. For the 4G system, PDCP entities, RLC) entities, MAC entities, and low layer entities maintained between the terminal device and the source network device are different from that maintained between the terminal device and the first target network device. In embodiments, in order to ensure the use of different keys, the PDCPs of the first protocol stack and the second protocol stack must be different. At least one of SDAP, RLC, MAC, and physical layers may be the same or different. The first protocol stack and the second protocol stack may share at least one of SDAP, RLC, MAC, and physical layers. Alternatively, the first protocol stack and the second protocol stack may each have SDAP, RLC, MAC, and physical layers respectively. Alternatively, the first protocol stack and the second protocol stack may share at least one of SDAP, RLC, MAC, and physical layers. Alternatively, the first protocol stack and the second protocol stack may each have SDAP, RLC, MAC, and physical layers respectively.

According to the technical schemes described above, when establishing a connection with the first target network device, first indication information and/or second indication information is sent to the source network device, to inform the source network device whether connection with the first target network device is successful or not. The technical schemes for transmitting indication information to the source network device may be implemented in different handover scenarios.

Embodiment 6

A target network device is provided. The target network device includes a third communication unit. The third communication unit is configured to send first indication information and/or second indication information to a network side, or send the first indication information and/or the second indication information to a source base station.

The first indication information is for indicating to the source network device that connection establishment between a terminal device and the target network device is successful. The second indication information is for indicating to the source network device that connection establishment between the terminal device and the target network device fails.

The first indication information contains identifier (ID) of the target network device with which the connection establishment is successful, or ID of the target network device with which the connection establishment is successful and ID of at least one other target network device with which the connection establishment fails, where the target network device is different from the at least one other target network device.

That is to say, if the connection establishment with the target network device is successful, the target network device sends the ID of the target network device to the source network device.

The second indication information contains: the reason for connection establishment failure with the first target network device; and/or ID of the first target network device.

The reason for connection establishment failure may include: T304 timer expiration; T307 timer expiration; random access reaches a maximum number of retransmissions; and other reasons for handover.

The T304 timer and T307 timer are preset timers. The T304 timer may be triggered by reception of the RRC connection reconfiguration information at the terminal device, where the RRC connection reconfiguration information contains mobility control information. The T307 timer may be triggered by reception of the RRC connection reconfiguration information at the terminal device, where the RRC connection reconfiguration information contains secondary cell group (SCG) mobility control information. The T304 timer will be stopped in response to handover success. The T307 timer will be stopped in response to random access success of the terminal device to PSCell. It is considered that the handover fails when the T304 timer or the T307 timer expires, and corresponding actions such as RRC reconnection or other information notification will be carried out, which will not be detailed herein.

The first indication information or the second indication information further contains: connection state of the terminal device.

The connection state of the terminal device includes one of: connection state with the source network device, connection state with the first target network device, connection state with the second target network device. The first target network device and the second target network device are target network devices for the terminal device to make handover; alternatively, the first target network device and the second target network device are secondary nodes (SN) and the source network device is a main node (MN). SN is named as SCG in the long term evolution (LTE) system and SN in the new radio (NR) system, SCG and SN however refer to the same concept, that is, a second service network device in DC scenario.

To be detailed, the connection state of the terminal device can be one of: the terminal device remains connected with the source network device and fails to be connected with the target network device; the terminal device is disconnected from the source network device and is connected with the target network device successfully; the terminal device fails to be connected with SCG and SCG connection change fails. In a scenario where multiple SCGs are configured, the terminal device fails to be connected with one SCG; in a scenario where multiple target cells are configured, the terminal device fails to be connected with one target cell. There may be other scenarios in which the technical scheme can be implemented, which will not be elaborated herein.

The following will describe the manner in which the first indication information and the second indication information are sent or received.

The third communication unit is configured to send the first indication information and/or the second indication information to the network side through NAS signaling, or, send the first indication information and/or the second indication information to the network side through RRC signaling.

The third communication unit is configured to receive the first indication information and/or the second indication information from the terminal device directly, or acquire the first indication information and/or the second indication information through the network side.

That is to say, when the terminal device is connected with the target network device successfully, the terminal device can send the first indication information to the first target network device directly and then first target network device forwards the first indication information to the source network device. Alternatively, the terminal device can send the first indication information to the network side such as E-UTRA.

On the other hand, when connection establishment between the terminal device and the target network device fails, the target network device can determine whether it is connected with the terminal device successfully and send the second indication information to the network side or to the source base station.

The first indication information and/or the second indication information may further contain measurement information obtained during handover. After receiving the first indication information and/or the second indication information, the network side or the source base station can use the measurement information for subsequent network optimization. The measurement information in the second indication information obtained during failed handover can be used by the network side for subsequent network optimization.

The technical solution provided herein is also applicable to a handover procedure in a dual-connection (DC) architecture. When the terminal device switches to a target base station from a source base station, the source base station can add the first target network device as an SN of the source network device. FIG. 10 is a schematic diagram illustrating a protocol stack in MCG bearer and MCG split bearer in DC architecture. The serving cell can be deemed as the protocol stack of the MN of the terminal device, and the target cell can be deemed as the protocol stack of the first target network device, that is, protocol stack of the SN. When switching to the SN from the MN, the data of PDCP can be send to the RLC of the target cell directly.

In this DC architecture, when the handover is successful, the source network device, which serves as the SN of the first target network device, can be deleted; on the other hand, when the handover fails, the first target network device can send the second indication information to the source network device and/or the network side.

According to the technical schemes described above, when establishing a connection with the first target network device, first indication information and/or second indication information is sent to the source network device, to inform the source network device whether connection with the first target network device is successful or not. The technical schemes for transmitting indication information to the source network device may be implemented in different handover scenarios.

Figure 7:
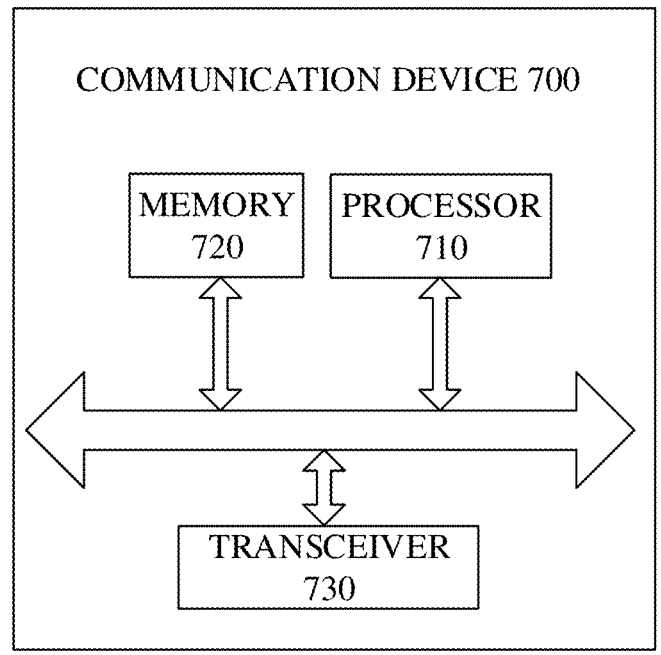
FIG. 7 is a schematic structural diagram illustrating a communication device according to embodiments.

FIG. 7 is a schematic structural diagram illustrating a communication device 700 according to embodiments. The communication device 700 can be the terminal device or network device described above. The communication device 700 includes a processor 710, which is configured to invoke and run programs stored in a memory to perform the methods provided herein.

As illustrated in FIG. 7, the communication device 700 includes a memory 720. The processor 710 is configured to invoke and run programs stored in the memory 720 to implement the methods provided herein.

The memory 720 can be a separate device independent of the processor 710 or may be integrated in the processor 710.

As illustrated in FIG. 7, the communication device 700 may further includes a transceiver 730, which can communicate with other devices under control of the processor 710. Specifically, the transceiver 730 can send information or data to other devices, or receive information or data from other devices.

The transceiver 730 may include a transmitter and a receiver. The transceiver 730 may further includes one or more antenna.

The communication device 700 can be the network device according to embodiments, and can perform the operations in the methods which are carried out by the network device. The details will not be repeated to avoid redundancy.

The communication device 700 can also be the terminal device or mobile terminal according to embodiments, and can perform the operations in the methods which are carried out by the terminal device or mobile terminal. The details will not be repeated to avoid redundancy.

Figure 8:
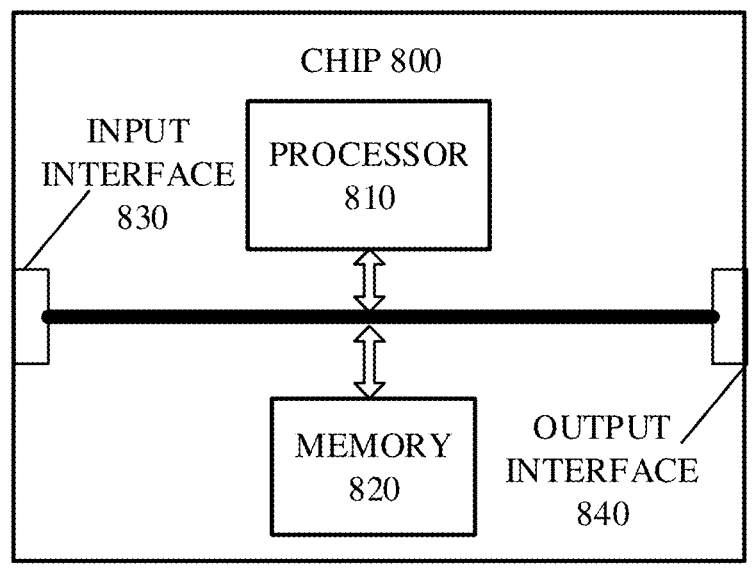
FIG. 8 is a schematic block diagram illustrating a chip according to embodiments.

FIG. 8 is a schematic block diagram illustrating a chip according to embodiments. The chip 800 of FIG. 8 includes a processor 810. The processor 810 can invoke and run programs stored in a memory to implement the methods provided herein.

As illustrated in FIG. 8, the chip 800 may further includes a memory 820. The processor 810 can invoke and run programs stored in a memory 820 to implement the methods provided herein.

The memory 820 can be a separate device independent of the processor 810 or may be integrated in the processor 810.

The chip 800 may further include an input interface 830. The input interface 830 can communicate with other devices or chips under control of the processor 810. Specifically, the input interface 830 can acquire information or data send by other devices or chips.

The chip 800 may further include an output interface 840. The output interface 840 can communicate with other devices or chips under control of the processor 810. Specifically, the output interface 840 can output information or data to other devices or chips.

The chip can be applied to the network device, and can perform the operations in the methods which are carried out by the network device. The details will not be repeated to avoid redundancy.

The chip can also be applied to the terminal device, and can perform the operations in the methods which are carried out by the terminal device. The details will not be repeated to avoid redundancy.

The "chip" herein may also be referred to as chip system or system-on-chip (SOC).

Figure 9:
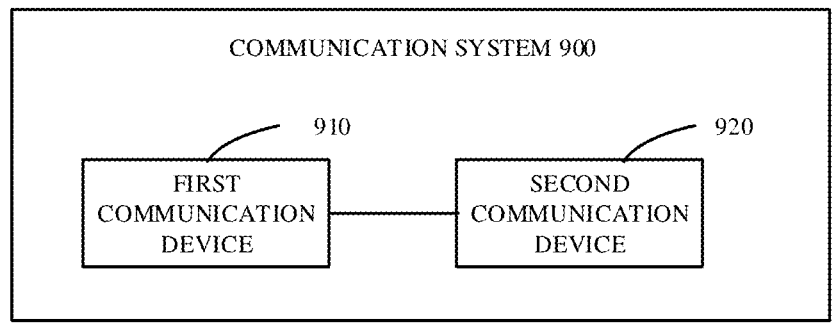
FIG. 9 is another schematic diagram illustrating a communication system architecture according to embodiments.

FIG. 9 is a schematic block diagram of a communication system 900 according to implementations. As illustrated in FIG. 9, the communication system 900 includes a terminal device 910 and a network device 920.

The terminal device 910 can achieve functions of the foregoing methods which are implemented by a terminal device, and the network device 920 can achieve functions of the foregoing methods which are implemented by a network device, which will not be repeated herein for the sake of simplicity.

The processor referred to herein may be an integrated circuit chip with signal processing capabilities. During implementation, each step of the foregoing method may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or execute the methods, steps, and logic blocks disclosed in implementations. The general purpose processor may be a microprocessor, or the processor may be any conventional processor or the like. The steps of the method disclosed in implementations may be implemented through a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory according to implementations may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or flash memory. The volatile memory can be a RAM that acts as an external cache. By way of example but not limitation, many forms of RAM are available, such as a static random access memory (static RAM, SRAM), a dynamic random access memory (dynamic RAM, DRAM), a synchronous dynamic random access memory (synchronous DRAM, SDRAM), a double data rate SDRAM (DDR SDRAM), an enhanced SDRAM (ESDRAM), a synchronous link dynamic random access memory (synch-link DRAM, SLDRAM), and a direct rambus random access memory (direct rambus RAM, DRRAM). The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

Implementations further provide a computer readable storage medium. The computer readable storage medium is configured to store computer programs.

The computer readable storage medium is applicable to the network device of implementations. The computer programs are operable with a computer to implement the operations performed by the network device described in the foregoing method implementations, which will not be repeated herein for the sake of simplicity.

Alternatively, the computer readable storage medium is applicable to the mobile terminal/the terminal device. The computer programs are operable with a computer to implement the operations performed by the mobile terminal/the terminal device described in the foregoing method implementations, which will not be repeated herein for the sake of simplicity.

Implementations further provide a computer program product. The computer program product includes computer program instructions.

The computer program product is applicable to the network device of implementations. The computer program instructions are operable with a computer to implement the operations performed by the network device described in the foregoing method implementations, which will not be repeated herein for the sake of simplicity.

Alternatively, the computer program product is applicable to the mobile terminal/the terminal device. The computer program instructions are operable with a computer to implement the operations performed by the mobile terminal/the terminal device described in the foregoing method implementations, which will not be repeated herein for the sake of simplicity.

Implementations further provide a computer program.

The computer program is applicable to the network device of implementations. The computer program, when executed by a computer, is operable with the computer to implement the operations performed by the network device described in the foregoing method implementations, which will not be repeated herein for the sake of simplicity.

Alternatively, the computer program is applicable to the mobile terminal/the terminal device. The computer program, when executed by a computer, is operable with the computer to implement the operations performed by the mobile terminal/the terminal device described in the foregoing method implementations, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, devices, and methods disclosed in implementations herein may also be implemented in various other manners. For example, the above device implementations are merely illustrative, e.g., the division of units is only a division of logical functions, and other manners of division may also available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the integrated units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for handover report, being applicable to a terminal device and comprising:
    sending indication information when connection establishment between the terminal device and a first target network device fails, wherein the indication information is for indicating to a source network device that connection establishment between the terminal device and the first target network device fails,
    wherein when the terminal device is initiating a connection with the first target network device, the terminal device also maintains a connection with the source network device, maintains a first protocol stack and a first key associated with the source network device, and maintains a second protocol stack and a second key associated with the first target network device, and
    wherein radio link control (RLC) media access control, media access control (MAC), and physical layers of the first protocol stack and the second protocol stack are different.

2. The method of claim 1, wherein connection establishment between the terminal device and a first target network device is successful on condition that:
    random access from the terminal device to the first target network device is successful; or
    synchronization between the terminal device and the first target network device is achieved.

3. The method of claim 1, further comprising:
receiving from the source network device a handover command, wherein the handover command contains configuration information with respect to at least one target network device, and the at least one target network device comprises the first target network device.

4. The method of claim 3, wherein the indication information comprises at least one of:
a reason for connection establishment failure with the first target network device; or
ID of the first target network device.

5. The method of claim 4, wherein the indication information comprises:
information instructing the source network device to select a second target network device for the terminal device to make handover.

6. The method of claim 1, wherein the indication information further comprises:
a connection state of the terminal device.

7. The method of claim 6, wherein sending the indication information comprises one of:
sending the indication information to the source network device through radio resource control (RRC) signaling; or
sending the indication information to the network side through non access stratum (NAS) signaling.

8. The method of claim 7, wherein sending the indication information comprises one of:
sending the indication information to the source network device directly; or
sending the indication information to the network side.

9. The method of claim 1, further comprising:
assigning a secondary node (SN) of the source network device as a main node (MN) when the terminal device makes handover, wherein the SN of the source network device is the first target network device; and
establishing connection with the first target network device.

10. The method of claim 9, further comprising:
when assigning the SN of the source network device as the MN, assigning the source network device as a SN of the first target network device.

11. The method of claim 9, further comprising:
before the handover,
adding the first target network device as the SN of the source network device.

12. The method of claim 9, further comprising:
performing RRC connection reestablishment when connection establishment between the terminal device and the first target network device fails.

13. The method of claim 9, wherein sending the indication information comprises one of:
sending the indication information to the source network device directly; or
sending the indication information to a network side.

14. The method of claim 13, wherein sending the indication information is triggered by one of:
secondary cell group (SCG) failure;
automatic retransmission request for data carried by main cell group (MCG) split bearer exceeds a preset retransmission threshold value; or
automatic retransmission request for data carried by SCG split bearer exceeds a preset retransmission threshold value.

15. The method of claim 1, further comprising:
sending first indication information when connection establishment between the terminal device and the first target network device is successful, wherein the first indication information is for indicating to the source network device that connection establishment between the terminal device and the first target network device is successful.

16. The method of claim 14, wherein the first indication information comprises one of:
identifier (ID) of the first target network device with which the connection establishment is successful; or
ID of the first target network device with which the connection establishment is successful and ID of at least one other target network device with which the connection establishment fails, wherein the first target network device is different from the at least one other target network device.

17. A terminal device, comprising:
at least one processor;
a transceiver; and
a memory storing instructions which, when executed by the at least one processor, cause the transceiver to:
send indication information when connection establishment between the terminal device and a first target network device fails, wherein the indication information is for indicating to a source network device that connection establishment between the terminal device and the first target network device fails,
wherein when the terminal device is initiating a connection with the first target network device, the terminal device also maintains a connection with the source network device, maintains a first protocol stack and a first key associated with the source network device, and maintains a second protocol stack and a second key associated with the first target network device, and
wherein radio link control (RLC) media access control, media access control (MAC), and physical layers of the first protocol stack and the second protocol stack are different.

18. The terminal device of claim 17, wherein the indication information comprises at least one of:
a reason for connection establishment failure with the first target network device;
ID of the first target network device; or
information instructing the source network device to select a second target network device for the terminal device to make handover.

19. The terminal device of claim 17, wherein the indication information further comprises:
a connection state of the terminal device.

20. The terminal device of claim 17, wherein the transceiver is configured to send the indication information upon one of:
secondary cell group failure;
automatic retransmission request for data carried by MCG split bearer exceeds a preset retransmission threshold value; or
automatic retransmission request for data carried by SCG split bearer exceeds a preset retransmission threshold value.

* * * * *